United States Patent
Burton

(10) Patent No.: US 9,478,877 B2
(45) Date of Patent: Oct. 25, 2016

(54) MOUNTABLE ELECTRICAL SOCKET APPARATUS

(71) Applicant: Timothy Burton, Watkins, CO (US)

(72) Inventor: Timothy Burton, Watkins, CO (US)

(*) Notice: Subject to any disclaimer, the term of this patent is extended or adjusted under 35 U.S.C. 154(b) by 0 days.

(21) Appl. No.: 14/212,488

(22) Filed: Mar. 14, 2014

(65) Prior Publication Data

US 2016/0036140 A1   Feb. 4, 2016

Related U.S. Application Data

(60) Provisional application No. 61/792,758, filed on Mar. 15, 2013.

(51) Int. Cl.
*H01R 9/16* (2006.01)
*H01R 24/78* (2011.01)
*H02G 3/20* (2006.01)
*H01R 24/68* (2011.01)

(52) U.S. Cl.
CPC ............... *H01R 9/16* (2013.01); *H01R 24/78* (2013.01); *H02G 3/20* (2013.01); *H01R 24/68* (2013.01)

(58) Field of Classification Search
CPC .............. H01R 25/003; H01R 25/006; H01R 13/5216
See application file for complete search history.

(56) References Cited

U.S. PATENT DOCUMENTS

| | | | |
|---|---|---|---|
| 2,552,061 A * | 5/1951 | Popp | H01R 13/447 439/136 |
| 2,581,024 A * | 1/1952 | Joyce | H01R 4/32 174/53 |
| 2,730,261 A | 1/1956 | Tutt | |
| 2,965,751 A | 12/1960 | Stiffel | |
| 3,562,512 A | 2/1971 | Kuribayashi et al. | |
| 3,794,956 A | 2/1974 | Dubreuil | |
| 3,885,852 A * | 5/1975 | Grove | H02G 3/18 174/51 |
| 3,913,773 A | 10/1975 | Copp et al. | |
| 4,172,628 A * | 10/1979 | Lingaraju | H01R 4/4818 439/441 |
| 4,511,198 A | 4/1985 | Mitchell et al. | |
| 4,740,175 A * | 4/1988 | Stumpff | H01R 24/76 439/441 |
| 5,171,159 A * | 12/1992 | Byrne | H02G 3/288 439/211 |
| 5,318,453 A | 6/1994 | Hwang | |
| 5,632,645 A * | 5/1997 | Love | H01R 4/22 174/87 |
| 5,674,089 A * | 10/1997 | Sampson | H02G 15/18 439/521 |
| 5,902,148 A * | 5/1999 | O'Rourke | H01R 25/003 439/505 |
| 7,198,513 B2 | 4/2007 | Marchese | |
| 8,235,748 B2 * | 8/2012 | Lacey | H02G 3/18 439/502 |
| 8,353,716 B2 * | 1/2013 | Keswani | H01R 4/4818 439/355 |
| 8,797,723 B2 * | 8/2014 | Hilton | H02G 3/123 315/159 |
| 2008/0057780 A1* | 3/2008 | O'Rourke | H01R 13/213 439/505 |

* cited by examiner

*Primary Examiner* — Gary Paumen
(74) *Attorney, Agent, or Firm* — The Keys Law Firm PLLC

(57) ABSTRACT

A mountable electrical socket apparatus comprises a socket assembly mounted in a base housing. The socket assembly, defined as a rectangular body having an electrical socket on a first side, an input wiring insert on second side, and an output wiring insert on a third side, is mounted in the base housing with a pair of mounting brackets. The base housing is circular basin which is configured to receive up to two discrete sets of electrical wires to be connected to the socket assembly. An input wire, from the electrical system of the building in which the mountable electrical socket apparatus is disposed or from another mountable electrical socket apparatus provides electrical power to the socket assembly generally and to the electrical socket. An output wire may be utilized to transmit electrical power which has been provided to one mountable electrical socket apparatus to another.

13 Claims, 3 Drawing Sheets

MOUNTABLE ELECTRICAL SOCKET APPARATUS

BACKGROUND OF THE INVENTION

1. Field of the Invention

This invention relates generally to electrical accessories and, more particularly, to a mountable electrical device having an electrical socket and adapted to be wired into a buildings electrical system.

2. Description of the Prior Art

The use of lighting fixtures and other electrical accessories is well known. Lighting fixtures are commonly installed in a desired location in a building, where there are hard wired into the buildings electrical system in order to access the requisite electricity to operate. A problem which still exists, however, is that when it is desired to change lighting fixtures or install new lighting fixtures, a substantial amount of electrical wiring work is often required. Thus, there remains a need for a mountable electrical socket apparatus which would eliminate the need to re-wire lighting fixtures when it is desired to replace such fixtures or add new lighting fixtures. It would be helpful if such a mountable electrical socket apparatus was enabled lighting fixtures and other electrical devices to be plugged in and unplugged freely once it had been initially wired into a building's electrical system. It would be additionally desirable for such a mountable electrical socket apparatus to be structured to allow a plurality of mountable electrical socket apparatus to be connected sequentially so that a plurality of electrical devices may be deployed.

The Applicant's invention described herein provides for a mountable electrical socket apparatus adapted to allow a user to mount an readily accessible electrical socket to which lighting fixtures can be attached. The primary components in Applicant's mountable electrical socket apparatus are a base housing, an electrical socket assembly and a plurality of connecting wires. When in operation, the mountable electrical socket apparatus enables light fixtures to be replaced or added to desired locations without requiring substantial electrical wiring work. As a result, many of the limitations imposed by prior art structures are removed.

SUMMARY OF THE INVENTION

A mountable electrical socket apparatus for enabling lighting fixtures to be replaced or installed without the need for electrical wiring. The mountable electrical socket apparatus comprises a socket assembly mounted in a base housing. The socket assembly, defined as a rectangular body having an electrical socket on a first side, an input wiring insert on second side, and an output wiring insert on a third side, is mounted in the base housing with a pair of mounting brackets. The base housing is circular basin which is configured to receive up to two discrete sets of electrical wires to be connected to the socket assembly. An input wire, from the electrical system of the building in which the mountable electrical socket apparatus is disposed or from another mountable electrical socket apparatus provides electrical power to the socket assembly generally and to the electrical socket. An output wire may be utilized to transmit electrical power which has been provided to one mountable electrical socket apparatus to another.

It is an object of this invention to provide a mountable electrical socket apparatus which would eliminate the need to re-wire lighting fixtures when it is desired to replace such fixtures or add new lighting fixtures.

It is another object of this invention to provide a mountable electrical socket apparatus was enabled lighting fixtures and other electrical devices to be plugged in and unplugged freely once it had been initially wired into a building's electrical system.

It is yet another object of this invention to provide a mountable electrical socket apparatus to be structured to allow a plurality of mountable electrical socket apparatus to be connected sequentially so that a plurality of electrical devices may be deployed.

These and other objects will be apparent to one of skill in the art.

DETAILED DESCRIPTION OF THE INVENTION

Figure 1A:
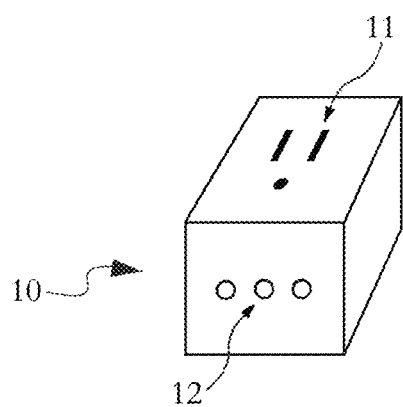
FIG. 1a is a front side perspective view of the socket assembly of a mountable electrical socket apparatus built in accordance with the present invention.
Figure 1B:
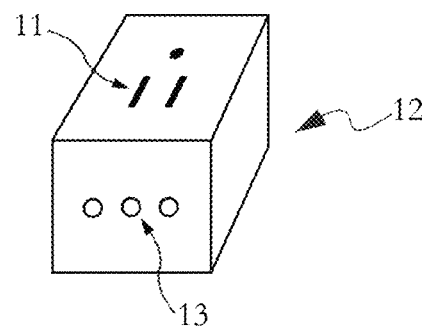
FIG. 1b is a back side perspective view of the socket assembly of a mountable electrical socket apparatus built in accordance with the present invention.

Referring now to the drawings and in particular FIGS. 1a and 1b, a socket assembly 10 of a mountable electrical socket apparatus is shown as a rectangular body having an electrical socket 11 on a first side, an input wiring insert 12 on second side, and an output wiring insert 13 on a third side. The electrical socket 11 is constructed as a conventional three prong electrical socket and is thus able to receive conventional U.S. three prong and two prong electrical plugs. The input wiring insert 12 enables electrical wiring from a traditional building electrical distribution system to be connected to the socket assembly 10. The input wiring insert 12 includes a connection port for the conventional black, white, and green wires (or the hot wire, neutral wire, and ground wire, respectively) of a building's electrical system.

The socket assembly 10 is internally wired so that when live electrical wires from a building's electrical system are connected to the connection ports of the input wiring insert 12, with the black wire to the black port, white wire to the white port, and green wire to the green port, electrical power from the building's electrical system is availed to the electrical socket 11 and to electrical wires which are connected to the output wiring insert 13. In this regard, a plurality of socket assemblies 10 can be operated from a single set of electrical wires from a building's electrical system by connecting said set of electrical wires to the input wiring insert 12 of a first socket assembly 10 and connecting a set of auxiliary electrical wires to the output wiring insert 12 of the first socket assembly 10 at one end and to the input wiring insert 12 of a second socket assembly 10 at the other end.

Figure 2:
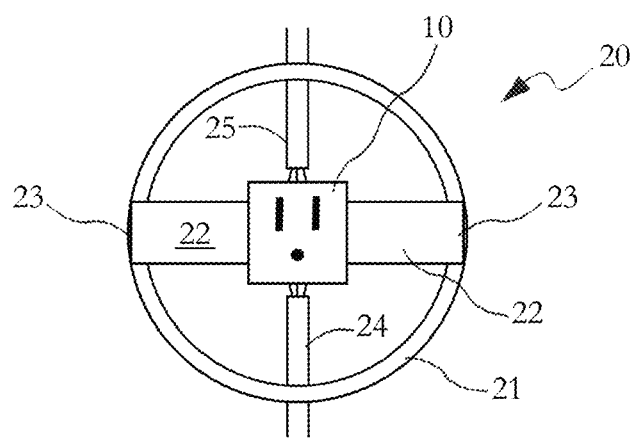
FIG. 2 is a top plan view of a mountable electrical socket apparatus built in accordance with the present invention.

Referring now to FIGS. 1a, 1b, and 2, a mountable electrical socket apparatus 20 is shown with the socket assembly 10 mounted in a base housing 21. The socket assembly 10 is mounted in the base housing 21 with a pair of mounting brackets 22 which extend from the socket assembly 10 and attach to the base housing 21 with mounting screws 23. An input wire 24, is shown having three distinct wire strands, each of which connect to the appropriate port of the input wiring insert 12. It is contemplated that the input wire 24 may be from the electrical system of the building in which the mountable electrical socket apparatus 20 is disposed, or may be the opposing end an electrical wire which is connected to the output wiring insert 13 of another mountable electrical socket apparatus 20. An output wire 25 is additionally shown having three distinct wire strands, each of which connect to the appropriate port of the output wiring insert 13.

Figure 3A:
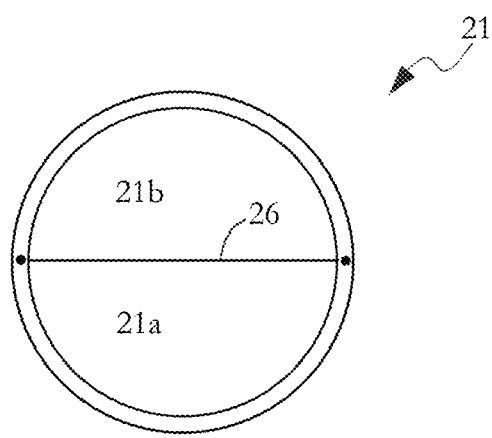
FIG. 3a is a top plan view of the base housing of a mountable electrical socket apparatus built in accordance with the present invention.
Figure 3B:
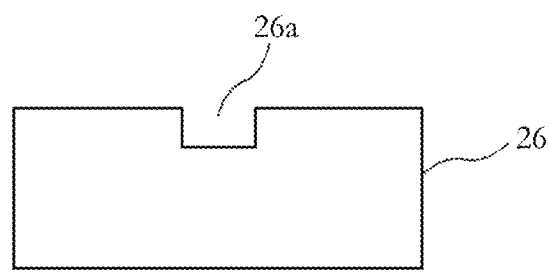
FIG. 3b is a side elevational view of the base housing of a mountable electrical socket apparatus built in accordance with the present invention.

Referring now to FIGS. 2, 3a and 3b, the base housing 21 is defined as a circular basin which includes a divider 26 which divides the interior into a first chamber 21a and a second chamber 21b. The divider 26 is shaped with a cut out area 26a sized to enable the socket assembly 10 to be inserted over the cut out area 26a when disposed in the base housing 21, enabling the divider to extend up to the mounting brackets 22 around the socket assembly 10.

When the strands of an electrical wire is connected a socket assembly 10 disposed in the base housing 21, a hardening gel is placed in the chamber in which the connected electrical wire is disposed. The hardening gel is defined as a fluid material which hardens and solidifies when exposed to air. The use of the hardening gel in the base housing 21 enables connected electrical wires to be secured in the socket assembly 10 and the base housing 21 such that they will not inadvertently fall out or become dislodged. Because the interior of the base housing 21 is divided into two discrete chambers, electrical wires can be connected and installed in the mountable electrical socket apparatus 20 at different times—if only the input wiring insert 12 is sought to be utilized at a given time, once a wire is installed only the first chamber 21a will be filled with hardening gel. Subsequently, if the output wiring insert is desired to be used, a wire can be connected to the output wiring insert 13 and the second chamber 21b, which would be free of hardened gel, can then be filled with hardening gel.

Figure 4:
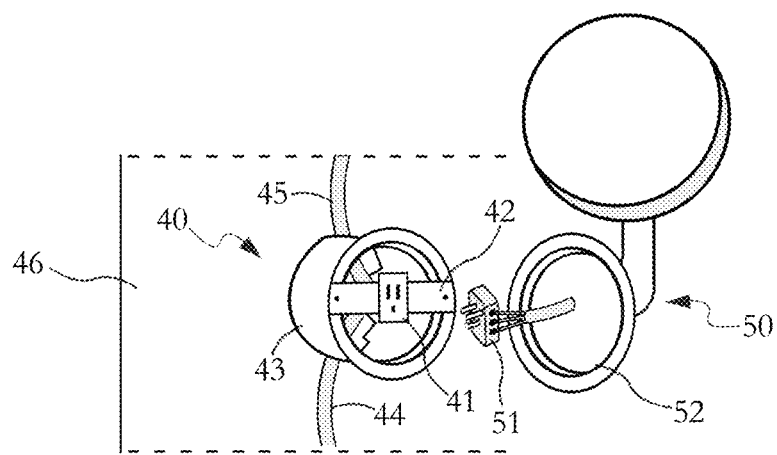
FIG. 4 is a side perspective view of a mountable electrical socket apparatus built in accordance with the present invention with a detached light assembly.
Figure 5:
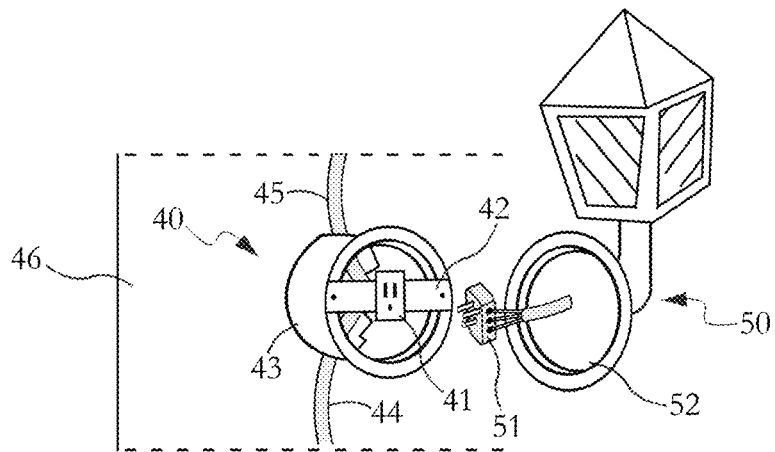
FIG. 5 is a side perspective view of a mountable electrical socket apparatus built in accordance with the present invention with a detached light assembly

Referring now to FIGS. 4 and 5, the mountable electrical socket apparatus 40 is shown with a plurality of discrete light fixtures 50 which could be interchanged without requiring any electrical wiring. The mountable electrical socket apparatus 40 includes the socket assembly 41 mounted in the base housing 43 therein through mounting brackets 42. An input wire 44 enters the base housing 43 and is connected to one side of the socket assembly 41 and an output wire 45, which is connected to the other side of the socket assembly 41, exits the base housing 43. The base housing 43 is mounted on a wall or other flat surface through a plurality a fasteners. In the preferred embodiment, the base housing 43 is mounted with a plurality of screws.

The light fixtures 50 include a socket plug 51 and a faceplate 52. The socket plug 51 is a conventional socket plug and able to engage the electrical socket on the socket assembly 41. The faceplate 52 is sized to fit over the top of mountable electrical socket apparatus 40 sufficient to completely cover the socket assembly 41 and the exposed chambers in the base housing 43. In the preferred embodiment, the faceplate 52 and the outer edges of the base housing 43 include threads which enable the faceplate 52 to screw on the base housing 43 and the socket plug 52 is secured to the socket assembly 41 with hardening gel.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A mountable electrical socket apparatus, comprising:
   a base housing defining a basin having a discrete first chamber, a discrete second chamber, and a divider, wherein said base chamber is adapted to be mounted on the wall or ceiling of a building;
   a socket assembly mounted within a perimeter rim of the basin defining the base housing, wherein said socket assembly includes an electrical socket and said socket assembly extends into both the first chamber and second chamber;
   an input wire integral with said base housing and connected to said socket assembly, wherein said input wire is configured to supply electrical power received from an electrical system outside the base housing to the socket assembly.

2. The mountable electrical socket apparatus of claim 1, wherein said input wire connects to the socket assembly by passing through said first chamber without entering the second chamber.

3. The mountable electrical socket apparatus of claim 2, wherein said socket assembly additionally includes an output wire integral with said base housing and connected to said socket assembly.

4. The mountable electrical socket apparatus of claim 3, wherein said socket assembly is additionally configured to supply electrical power received from the input wire to the output wire.

5. The mountable electrical socket apparatus of claim 3, wherein said output wire connects to the socket assembly by passing through said second chamber without entering the first chamber.

6. The mountable electrical socket apparatus of claim 5, wherein said input wire is secured in the first chamber and said output wire is secured in the second chamber with a hardening gel.

7. A method of connecting an electrical device to a mountable electrical socket apparatus, comprising the steps of:
   providing a base housing defining a basin and adapted to be mounted on the wall or ceiling of a building;
   mounting a socket assembly within a perimeter rim of the basin defining the base housing, wherein said socket assembly has an electrical socket and an input wiring insert and is configured to supply electrical power received from an electrical wire in the input wiring insert to the electrical socket;
   connecting strands of a live electrical wire to the input wiring insert, wherein said live electrical wire is adapted to pass through the socket assembly;
   rigidly securing the live electrical wire connected to the input wiring insert inside said socket assembly; and
   connecting the electrical socket plug of an electrical device to the electrical socket.

8. The method of claim 7, wherein:
   said base housing includes a discrete first chamber, a discrete second chamber, and a divider;

said socket assembly additionally includes an output wiring insert;

said input wiring insert extends into the first chamber and said output wiring insert extends into the second chamber;

said socket assembly is additionally configured to supply electrical power received from an electrical wire in the input wiring insert to the output wiring insert; and any electrical wire connected to said input wiring insert enters and is contained solely in the first chamber of the base housing and any electrical wire connected to said output wiring insert enters and is contained solely in the second chamber of the base housing.

9. The method of claim 8, additionally comprising the step of filling the first chamber with a hardening gel, thereby rigidly securing the live electrical wire connected to the input wiring insert inside said socket assembly.

10. The method of claim 8, additionally comprising the steps of:

connecting strands on the end of a second electrical wire to the output wiring insert; and rigidly securing the second electrical wire connected to the output wiring insert inside said socket assembly.

11. The method of claim 10, additionally comprising the step of filling the second chamber with a hardening gel, thereby rigidly securing the second electrical wire connected to the output wiring insert inside said socket assembly.

12. The method of claim 7, wherein the socket assembly is mounted in the base housing with mounting brackets.

13. A mountable electrical socket apparatus, comprising:

a base housing defining a basin and adapted to be mounted on the wall or ceiling of a building;

a socket assembly mounted within a perimeter rim of the basin defining the base housing, wherein said socket assembly includes an electrical socket;

an input wire integral with said base housing and connected to said socket assembly, wherein said input wire is rigidly secured in the socket assembly and configured to supply electrical power received from an electrical system outside the base housing socket assembly wherein said input wire is rigidly secured in the socket assembly with a hardening gel.

\* \* \* \* \*